US008683848B1

(12) United States Patent
Taft et al.

(10) Patent No.: US 8,683,848 B1
(45) Date of Patent: Apr. 1, 2014

(54) OIL WELL TUBING PRESSURE TESTING SYSTEM AND METHOD OF USE

(75) Inventors: Don Taft, Bakersfield, CA (US); Don Hoover, Bakersfield, CA (US); Don Siewell, Bakersfield, CA (US)

(73) Assignee: C&H Testing Service, LLC, Bakersfield, CA (US)

( * ) Notice: Subject to any disclaimer, the term of this patent is extended or adjusted under 35 U.S.C. 154(b) by 241 days.

(21) Appl. No.: 13/006,388

(22) Filed: Jan. 13, 2011

Related U.S. Application Data

(60) Provisional application No. 61/294,796, filed on Jan. 13, 2010.

(51) Int. Cl.
*G01M 3/00* (2006.01)
(52) U.S. Cl.
USPC ........... 73/49.5; 73/152.55; 285/38; 285/390; 166/250.06; 166/75.11; 166/75.13; 166/90.1
(58) Field of Classification Search
USPC ..................... 285/30, 38, 65, 390; 73/49.5; 166/75.11, 75.13, 90.1, 94.1, 250.06
See application file for complete search history.

(56) References Cited

U.S. PATENT DOCUMENTS

| | | | | | |
|---|---|---|---|---|---|
| 228,171 | A | * | 6/1880 | Boyd | 138/96 T |
| 795,508 | A | * | 7/1905 | Hays | 285/27 |
| 1,218,359 | A | * | 3/1917 | Beatty | 285/123.1 |
| 2,258,066 | A | * | 10/1941 | Oyen | 285/328 |
| 2,259,232 | A | * | 10/1941 | Stone | 175/325.5 |
| 2,414,113 | A | * | 1/1947 | Mapes | 73/49.8 |
| 2,839,315 | A | * | 6/1958 | Arterbury et al. | 285/3 |
| 3,165,920 | A | * | 1/1965 | Loomis | 73/40.5 R |
| 3,232,638 | A | * | 2/1966 | Hollander | 285/55 |
| 3,495,443 | A | * | 2/1970 | Switzer et al. | 73/40.5 R |
| 3,675,719 | A | * | 7/1972 | Slator et al. | 166/297 |
| 3,712,115 | A | * | 1/1973 | Miller | 73/49.1 |
| 3,800,596 | A | * | 4/1974 | Phillips et al. | 73/40.5 R |
| 4,040,441 | A | * | 8/1977 | Brown et al. | 137/519.5 |
| 4,442,907 | A | * | 4/1984 | Sexton | 173/164 |
| 4,617,992 | A | * | 10/1986 | Abel | 166/91.1 |
| 4,655,284 | A | * | 4/1987 | McIlvride | 166/84.1 |
| 4,881,598 | A | * | 11/1989 | Stockinger et al. | 166/250.08 |
| 5,012,865 | A | * | 5/1991 | McLeod | 166/90.1 |
| 5,020,611 | A | * | 6/1991 | Morgan et al. | 175/215 |
| 5,195,588 | A | * | 3/1993 | Dave | 166/264 |
| 5,908,212 | A | * | 6/1999 | Smith et al. | 285/333 |
| 6,866,062 | B2 | * | 3/2005 | Lammers | 137/543 |
| 7,571,936 | B2 | * | 8/2009 | Schneider et al. | 285/45 |
| 7,650,936 | B2 | * | 1/2010 | McGuire et al. | 166/75.13 |
| 7,828,053 | B2 | * | 11/2010 | McGuire et al. | 166/177.5 |

(Continued)

*Primary Examiner* — Hezron E Williams
*Assistant Examiner* — Alexander Mercado
(74) *Attorney, Agent, or Firm* — James M. Duncan, Esq.; Klein DeNatale Goldner

(57) ABSTRACT

An improved hydrotest testing system comprises a safety stop which prevents the testing tools from being blown out of the top of the tubing string. The safety stop is made up into the upward facing box of the tubing joint to be tested, where the stop is positioned between the tool assembly placed within the tubing joint and the no-go head assembly which is located at the surface during the testing operation. Once the safety stop has been made up into upward facing box, the tool assembly is set within the joint to be tested and the joint pressure tested. The safety stop has a generally cylindrical body which has a bore extending through its length, where the bore has a reduced diameter throat which is sized smaller than portions of the downhole testing tool.

18 Claims, 7 Drawing Sheets

(56) References Cited

U.S. PATENT DOCUMENTS

| | | | |
|---|---|---|---|
| 7,896,087 B2* | 3/2011 | Dallas | 166/381 |
| 8,151,628 B1* | 4/2012 | Smida | 73/37 |
| 8,205,916 B2* | 6/2012 | Dallas et al. | 285/354 |
| 2002/0093431 A1* | 7/2002 | Zierolf | 340/854.1 |
| 2004/0231856 A1* | 11/2004 | Dallas et al. | 166/379 |
| 2008/0184796 A1* | 8/2008 | Smida et al. | 73/438 |
| 2009/0091131 A1* | 4/2009 | Dallas et al. | 285/354 |
| 2012/0174654 A1* | 7/2012 | Smida | 73/37 |

\* cited by examiner

OIL WELL TUBING PRESSURE TESTING
SYSTEM AND METHOD OF USE

CROSS-REFERENCE TO RELATED APPLICATIONS

U.S. Provisional Application No. 61/294,796 for this invention was filed on Jan. 13, 2010, for which application these inventors claim domestic priority.

BACKGROUND OF THE INVENTION

It is desirable that when tubing utilized as production equipment for oil and gas wells is initially installed in the well, or when being reinstalled following remedial work on the well, to ascertain the integrity of each section or joint of tubing. Tubing failures can be very costly due to the relatively high expense of the equipment and manpower required to pull out the defective tubing joint, and because of the lost production which may result during the time the well is off production. It is a commonly practiced procedure, when tubing is run into a well, to pressure test each joint of tubing in order to determine whether each joint has become fatigued, or has developed pinhole leaks or has in some other way been weakened so as to decrease its capability of satisfactorily conveying fluids under high pressure. It is known to apply internal fluid pressure to each joint of tubing in a tubing string to determine the integrity of each joint in a process commonly referred to as "hydrotesting" the tubing. This is process involves the use of pressurized water and a calibrated pressure meter to determine if the tubing is watertight at a pre-determined pressure. The applied pressure can range anywhere from 5,000 to 20,000 pounds per square inch.

The hydrotesting process typically employs a pair of axially spaced test cups made of an elastomeric material and mounted on the mandrel portion of a test tool inserted in the tubing joint to be tested by a wireline or winch. Slips on the test tool are set placing the test tool within the joint to be tested, so that the test tool will set within each joint to be tested, and allowing the wireline to be disconnected from the test tool without the test tool falling through the tubing. The test cups are backed against stops carried on the mandrel in opposed relation, and fluid is admitted through a tubular portion of the mandrel which is perforated to allow the fluid to fill the space between the test cups. As the fluid thus admitted to the space between the test cups is pressured up, the test cups flare out and undergo expansion so as to form a fluid-tight seal with the internal wall of the tubing under test. Continued increase in the pressure of the fluid between the test cups correspondingly increases the pressure on the walls of the tubing under test so that any propensity to fail under the high pressure thus developed is manifested by the failure of the tubing section, or ejection of the test fluid through pinhole leaks or fractures which may have previously developed in the tubing section. An example of an oilfield tubing hydrotesting apparatus is disclosed in U.S. Pat. No. 4,149,566 to Stowe.

The mandrel of the testing tool is sized to pass easily into the tubing to be tested. The mandrel carries slips, usually below the test cups, and a fixed upper back-up flange which functions as a stop or abutment against which the base end of the upper cup which limits axial movement of the upper cup during testing. In similar fashion, a lower back-up flange functions as a back-up member limiting axial movement of the lower cup. Between the upper cup and the lower cup the testing tool comprises means for the release of fluid inside the mandrel to exit to the outside, such as perforations. When the mandrel portion of the testing tool is inserted in the tubing to be tested and the test cups have been placed in position within the tubing joint, a hydraulic conduit is connected to the top of the testing tool and fluid is introduced into the test tool through the tubular portion of the mandrel, which fluid fills the interior of the tubing between the test cups so as to force the test cups apart and against the upper and lower back-up flanges. The pressure of the fluid introduced to the interior of the tubing is then increased, with the result that the opposing test cups seal against the interior wall of the tubing. The pressure of the test fluid is then further increased until a desired magnitude of pressure within the tubing is attained.

Once this test pressure is exceeded, if the tubing does not fail, or if a pinhole or previously developed fracture of some type is not revealed by fluid leakage or by loss of pressure, the tubing is considered to have successfully passed the pressure test, and the pressure of the internal fluid can be relieved. With the slips of the test tool assembly holding it within the tubing joint just tested, an additional joint of tubing can be made up to the tubing string and run into the well. A wireline overshot is then run into the tubing to retrieve the test tool and bring it into the newly installed joint of tubing and that joint tested as described above. This process is continued until the tubing is completely installed within the well.

If there is a failure in the test cups, the slips, or if there is an unexpected pressure buildup below the test tool resulting from inflow of reservoir fluids such as gas, water or oil, the test tool can be violently propelled through the top of the tubing which, in the known practice, is left open during the hydrotest operation. This potentially explosive expulsion of the test tools from the top of the tubing creates a potential hazard to personnel and property. Moreover, if the tool is expelled because of a fluid buildup below the test tool, once the tool is expelled through the tubing, there can be a release of well fluids into the environment.

SUMMARY OF THE INVENTION

The present method and apparatus are directed toward a solution to the above-identified problem. The disclosed apparatus comprises an improved hydrotest testing tool comprising a safety stop which prevents the testing tools from being blown out of the top of the tubing string. This stop is made up into the upward facing box of the tubing joint to be tested, where the stop is positioned between the portion of the pressure test tool assembly placed within the tubing joint and the no-go head assembly which is located at the surface during the testing operation. Once the safety stop has been made up into upward facing box, a tool assembly is set within the joint to be tested and the joint pressure tested. Once the joint has been tested, assuming the joint satisfactorily passes, the safety stop is removed and a new joint of tubing is made up into the tubing string and lowered into the well, with the tool assembly remaining in the last joint to be tested. The safety stop apparatus is installed in the upwardly facing box of the new tubing joint and a wireline overshot is run into the tubing and retrieves the test tool, bringing the no-go head assembly back to the surface, and the new joint tested. This cycle is repeated, testing the tubing joints as desired or necessary. Any joints which do not pass the pressure test are removed from the tubing string.

The tool assembly comprises a mandrel having an upper downward facing cup and an axially-aligned lower upward facing cup, and may comprise slips for holding the test tool as desired within the tubing string. The disclosed tool stop apparatus comprises a generally cylindrical body having a bore extending through its length, the cylindrical body comprising a downward facing pin and an axially-aligned upward facing box end, and an inside diameter smaller than the outside diameter of a portion of the test tool above the upper downward facing cup, thereby providing a stop to the tool assembly, where the difference between the inside diameter of the disclosed stop is sufficiently different from the outside diameter of the pertinent portion of the tool assembly to provide a sufficient engaging surface to stop an upwardly propelled tool assembly at expected maximum pressures. For example, for 2⅞ inch tubing, the internal bore of the stop is 1.9 inches, as compared to the internal diameter of the tubing, which will range from approximately 2.2 to 2.4 inches depending upon the weight of the tubing. The threads of the downward facing pin of the tool stop apparatus are adapted to engage the upward-facing box of the tubing.

The disclosed tool stop apparatus may further comprise handles for rapid deployment, allowing the tool stop apparatus to be installed by hand without the need for a wrench. The tool stop apparatus may further comprise a downward facing O-ring which creates a seal with the upward facing box of the tubing. The upward facing box end of the tool stop apparatus may comprise threads which are adapted to receive a valve assembly or other apparatus which would be utilized for sealing off the tubing in the event of a pressure surge (i.e. kick or downhole blowout), and for receiving circulation from fluid pumped into the well to gain control.

The tool stop apparatus may further comprise one or more threaded apertures which are oriented normal to the axis defined by the downward facing pin and upward facing box end. These threaded apertures may be utilized for attaching one or more of the handle members which have threaded ends for making up into the threaded apertures. The threaded apertures may be placed within an external shoulder member which may be fashioned in the generally cylindrical body of the tool stop apparatus.

In the disclosed method, the hydrotesting tool assembly is run into the tubing string and set at the desired position within the last joint of tubing run into the well, with the disclosed tool stop apparatus placed between the tool assembly and the no-go test head. Prior to pressuring up the tool assembly, the tool stop apparatus is made up into the box end of the last joint of tubing run into the well, with the box end of the tubing joint, the tool stop apparatus, and the no-go head assembly conveniently located at the rig floor. A hydraulic line is inserted into the no-go head assembly and hydraulic pressure is thereafter applied to the tool assembly as described above to determine the integrity of the tubing.

Once the tubing joint has been tested, the pressure test hose is released from the no-go head assembly, the tool stop apparatus removed from the upwardly facing tubing box, and, assuming the test was satisfactory, the next joint or stand of tubing made up into the tubing box and the new joint or stand run into the well until the upward facing box of the joint or stand is at the rig floor. At this point a wireline overshot is run into the tubing to retrieve the test tool and bring it within the next joint of tubing to be tested, with the no-go head assembly extending through the upwardly facing tubing box. The tool stop apparatus is installed, the hydraulic line connected to the no-go head assembly, and the next joint tested. This process is repeated as the tubing string is made up and run into the well until the tubing string has been tested as desired. Tubing joints which fail the pressure test are removed from the tubing string as they are discovered.

DETAILED DESCRIPTION OF THE EMBODIMENTS

Figure 1:
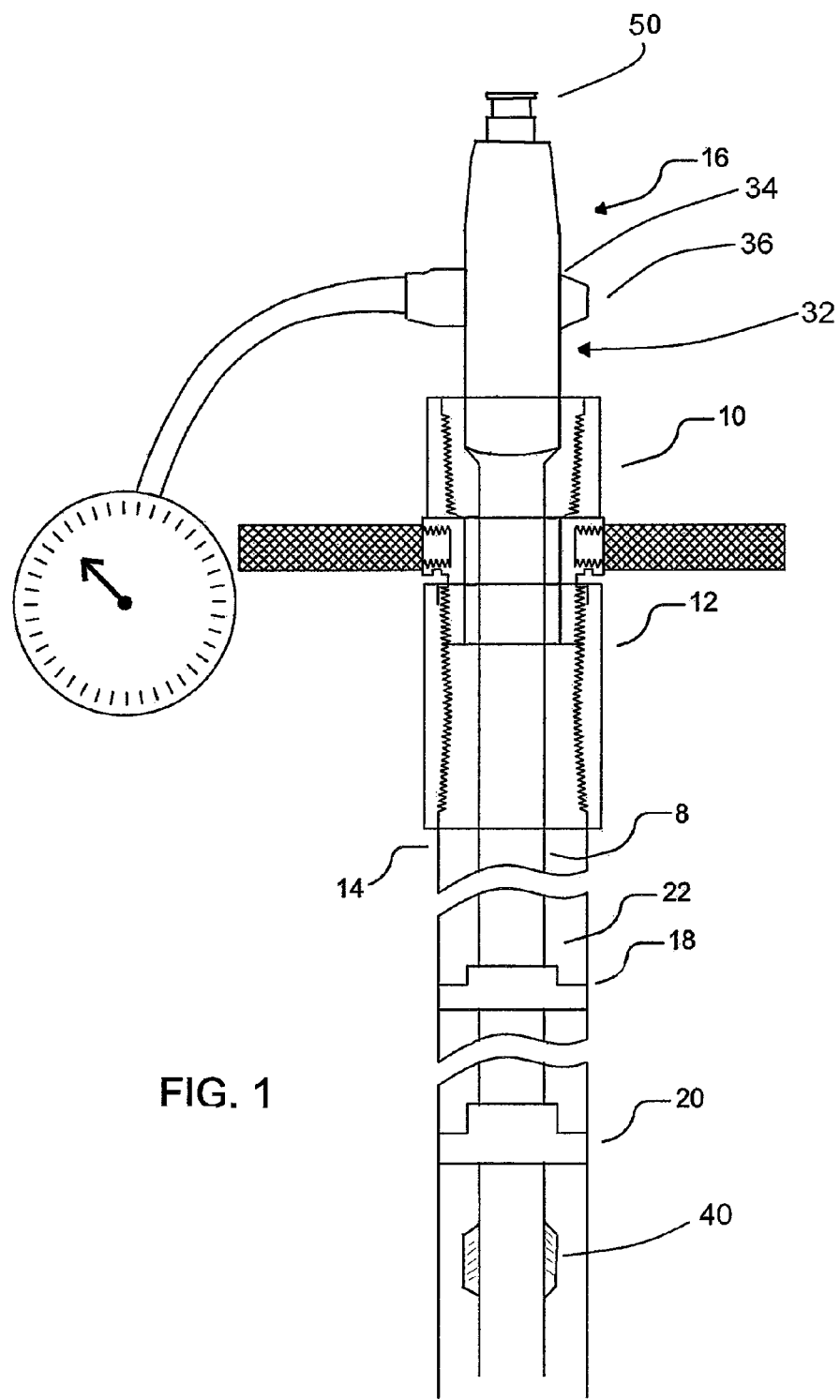
FIG. 1 schematically shows the configuration of a generally used hydrotesting tool, and shows the placement of an embodiment of the tool stop apparatus with respect to the other components of the tubing test assembly.

Turning now to the figures, FIG. 1 schematically shows an embodiment of an improved hydrotest assembly 16 which utilizes the disclosed tool stop apparatus 10 as an improvement. The tool stop apparatus 10 is attached to the upwardly facing box 12 of a joint of tubing 14. The hydrotest assembly 16 comprises a tool assembly 8 which is depicted in FIG. 1 as being within a joint of tubing 14 to be tested. The tool assembly 8 comprises an upper downward facing cup 18 and an axially-aligned lower upward facing cup 20 which are mounted on a mandrel 22. The upper downward facing cup 18 and the lower upward facing cup 20 are typically spaced such that the tool assembly 8 will test most of the length of a standard length of tubing, approximately thirty feet long. The hydrotest assembly further comprises a no-go test head assembly 32 which comprises a liquid inlet 34 into which a male hydraulic fitting 36 is installed via a quick-connect/disconnect fitting. The male hydraulic fitting 36 is connected to a pressure reading and/or recording device 38. The hydrotest tool may further comprise slips 40, which may be set within a tubing joint to prevent the tool from sliding downhole when the test tool is released.

A wireline connector head assembly 50 is at the top of the no-go test head assembly 32 to allow the connection of an overshot device (not shown) which is attached to either a winch line or sand line, so the tool assembly 8 may be recovered and either withdrawn completely from the tubing string or raised into and pulled upward into the next joint of tubing 14 to be tested. The disclosed tool stop apparatus will be placed between the tool assembly 8 and the no-go test head assembly 32.

Figure 2:
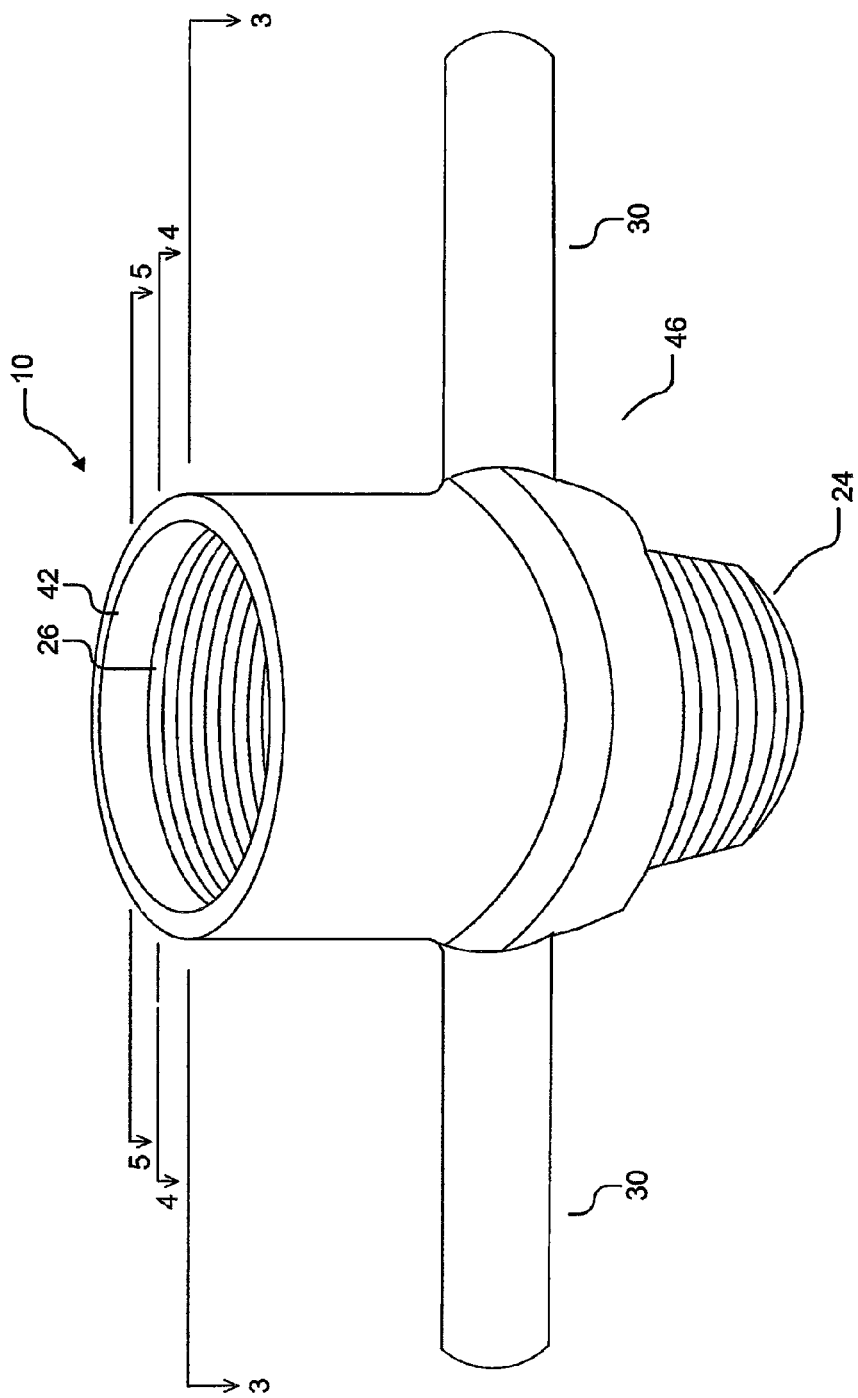
FIG. 2 shows an isometric view of an embodiment of the tool stop apparatus.

FIG. 2 shows a perspective view of an embodiment of the tool stop apparatus 10. The tool stop apparatus 10 comprises a downward facing pin 24 and an axially-aligned upward facing box end 26. The threads of pin 24 are compatible with the upwardly facing box end 12 of the tubing joint 14. The top of the tool stop apparatus 10 comprises threads 26. The tool stop apparatus 10 has a reduced diameter throat 42 below the upward facing box end 26, where the reduced diameter throat has an inside diameter d. Inside diameter d of throat 42 is significantly smaller than the backing plate of downward facing cup 18, such that if the tool assembly 8 received any pressure which would tend to eject the tool assembly out of the tubing string, the backing plate, and hence the tool assembly, would be safely stopped at the reduced diameter throat 42.

Another feature of the disclosed tool stop apparatus 10 is the upward facing box end 26. In ordinary service, the test head assembly 32 will be suspended above the upward facing box end 26 by a winch line or cable and the tool stop apparatus will be screwed into the upward facing box 12 of the tubing. However, upward facing box end 26 may be used for a variety of purposes. First, if the tubing installation operation is shut down for any period of time and the tool assembly 8 removed, a shut-off valve or other apparatus may be screwed into upward facing box end 26 to maintain control of the well. In addition, if the event there is a kick in the well where the tubing needs to be shut in quickly, upward facing box end 26 may be utilized for rapid placement of a shut-off valve or other apparatus. In this regard, it is to be noted that upward facing box end 26 comprises a relatively deep stabbing guide 42 to facilitate the rapid insertion of a shut-off valve.

Figure 3:
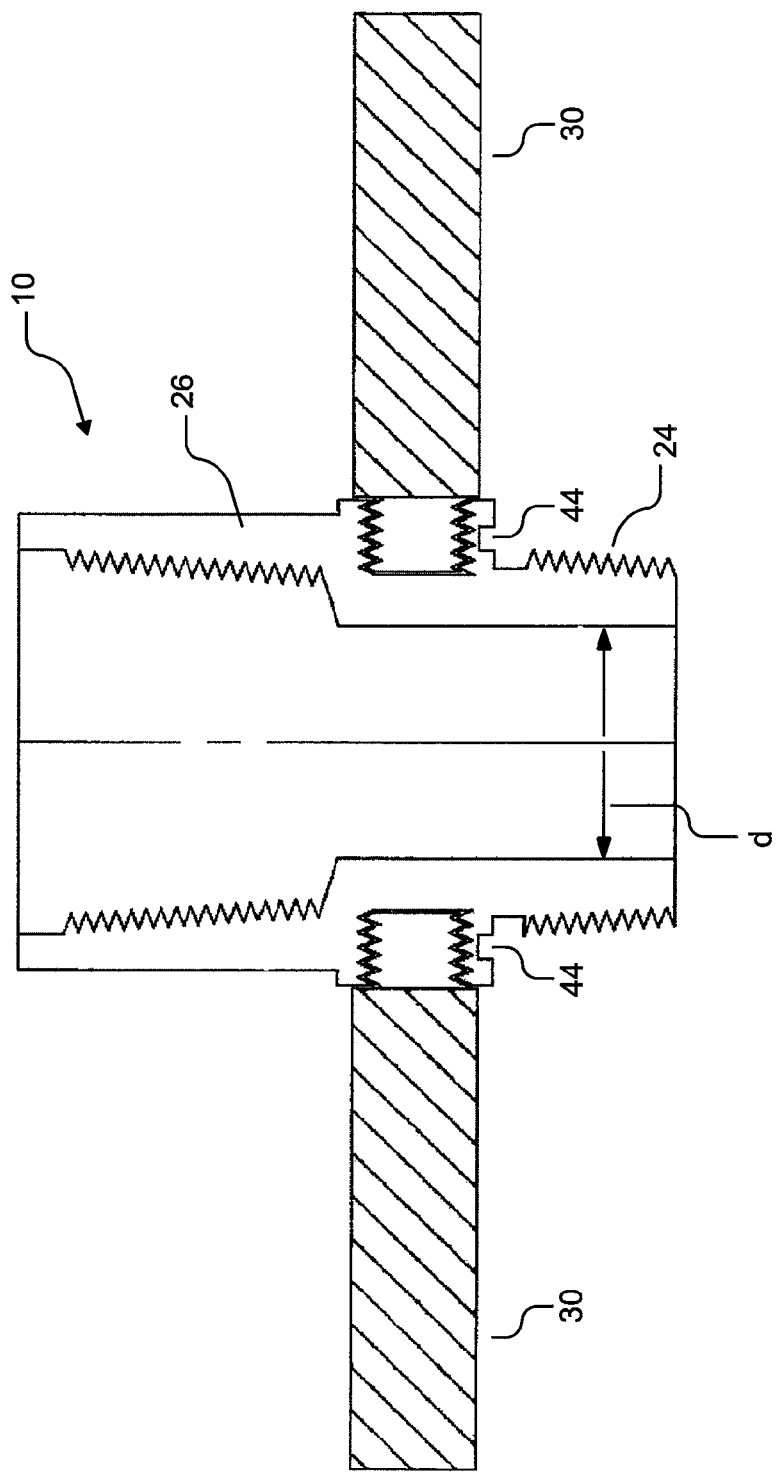
FIG. 3 shows a first sectional view of an embodiment of the tool stop apparatus taken along line 3-3 of FIG. 2.

FIG. 3 shows a sectional view of an embodiment of the disclosed tool stop apparatus 10 where the sectional view is taken along the middle of the tool stop apparatus. For a tool stop apparatus 10 utilized with 2⅞ inch tubing, the reduced diameter throat 42 will have a diameter, d, of 1.9000 inches, which is significantly smaller than the internal diameter of all weights of conventional 2⅞ inch oilfield tubing. Threads 24 are recommended to be tested on a hydraulic press to 45 tons. The tool stop apparatus 10 comprises an O-ring groove 44 for disposition of an O-ring to create a tighter seal between the tool stop apparatus and the tubing box 12 to which the tool stop apparatus is connected.

Figure 4:
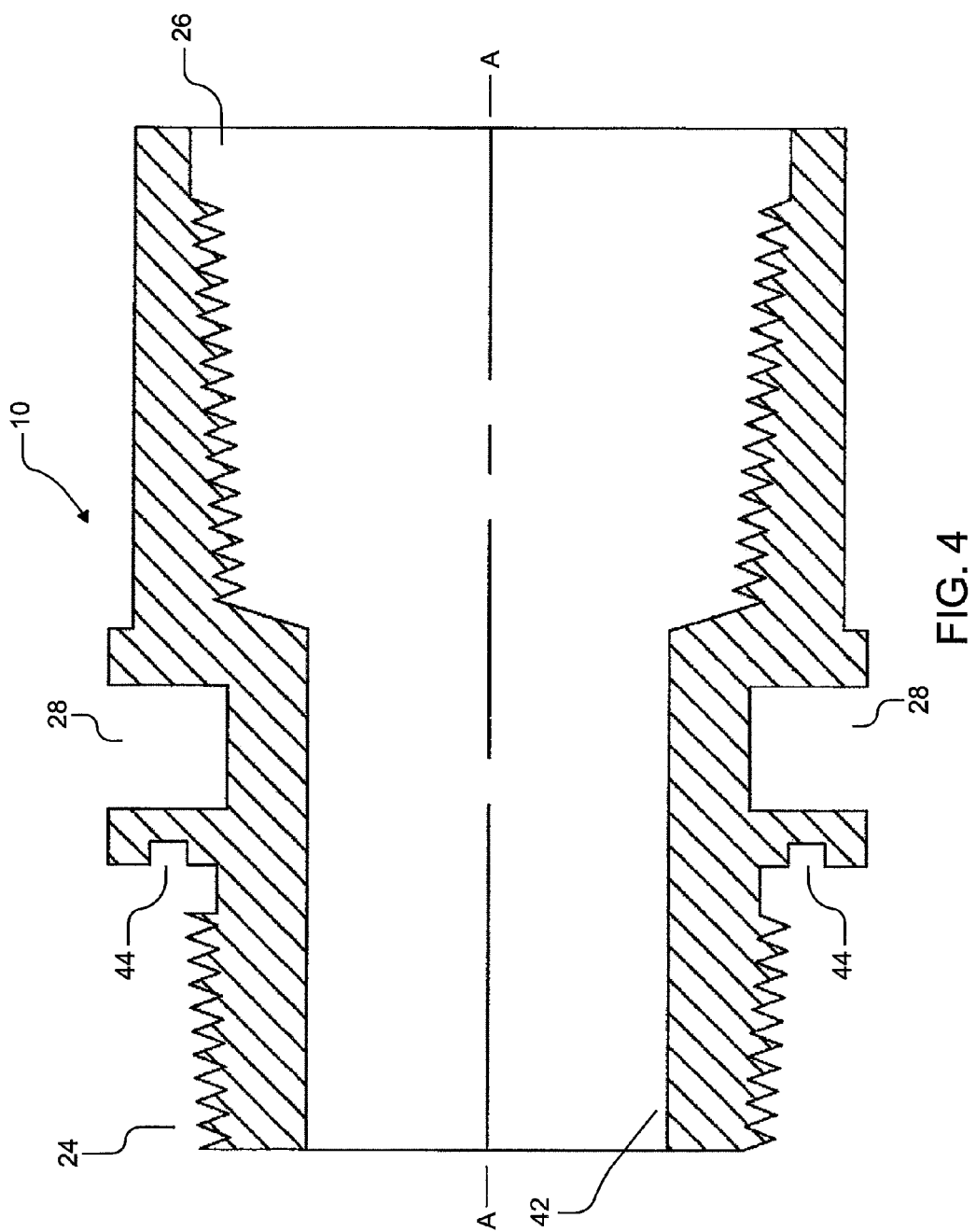
FIG. 4 shows a second sectional view of an embodiment of the tool stop apparatus taken along line 4-4 of FIG. 2.

FIG. 4 shows another sectional view of an embodiment of the tool stop apparatus 10. This figure shows threaded apertures 28 which are oriented normal to the axis A defined by the downward facing pin 24 and upward facing box end 26. Threaded apertures 28 may be utilized for attaching one or more handle members 30 which have threaded ends 32 for making up into the threaded apertures. The threaded apertures 28 may have any suitable thread, such as a ¾ inch-10 NC thread.

Figure 5:
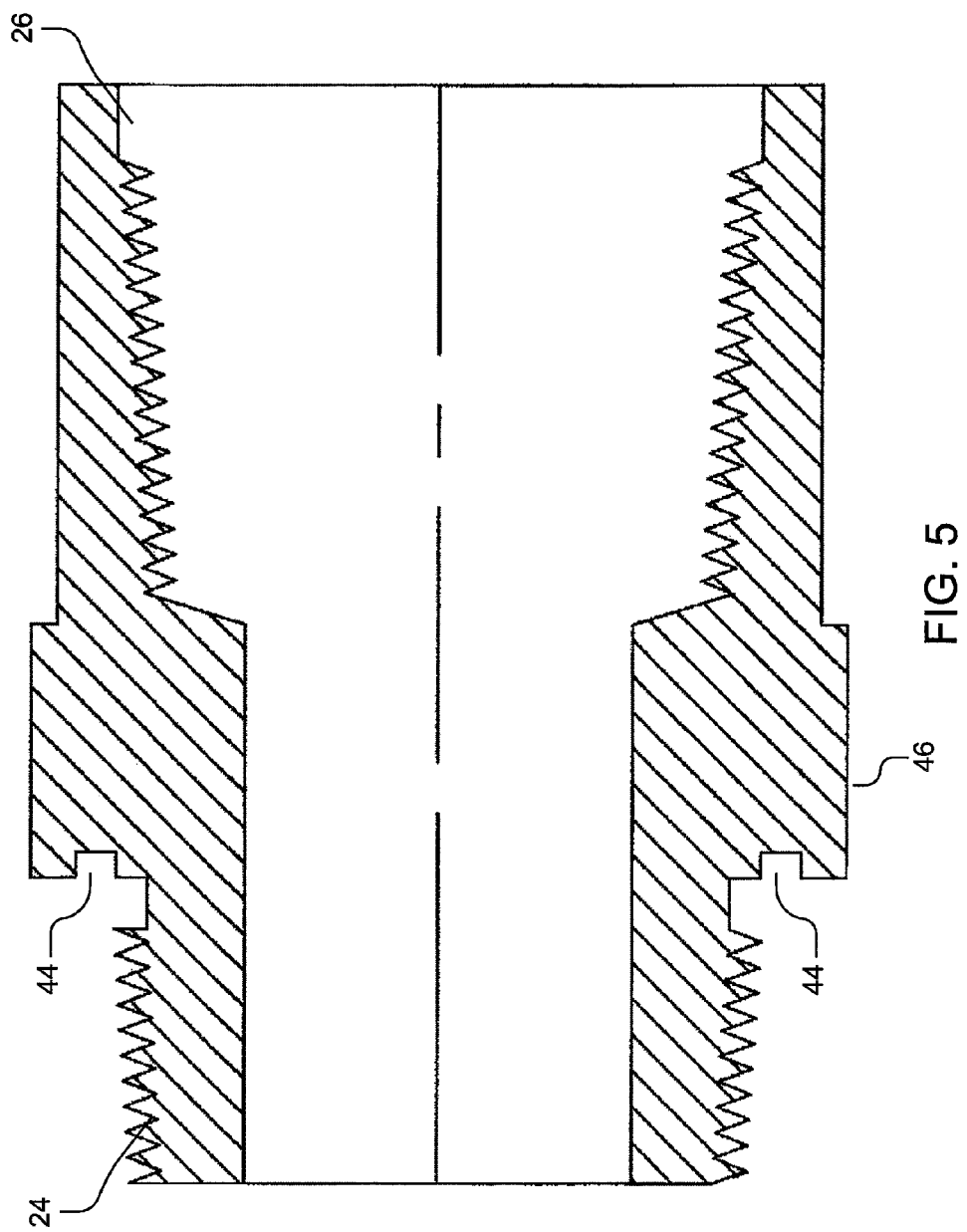
FIG. 5 shows a third sectional view of an embodiment of the tool stop apparatus taken along line 5-5 of FIG. 2.

FIG. 5 shows another sectional view which shows the substantial wall thickness of an external shoulder 46 which may be fashioned in the cylindrical body of the tool stop apparatus 10. The external shoulder 46 provides a competent structure into which threaded apertures 28 may be placed. This substantial wall thickness provides significant structural integrity for the tool stop apparatus 10, which is required for a device which will be subjected to substantial cyclical use in a harsh heavy industrial use. External shoulder 46 may comprise a downward facing surface 48 into which O-ring groove 44 may be manufactured.

Figure 6:
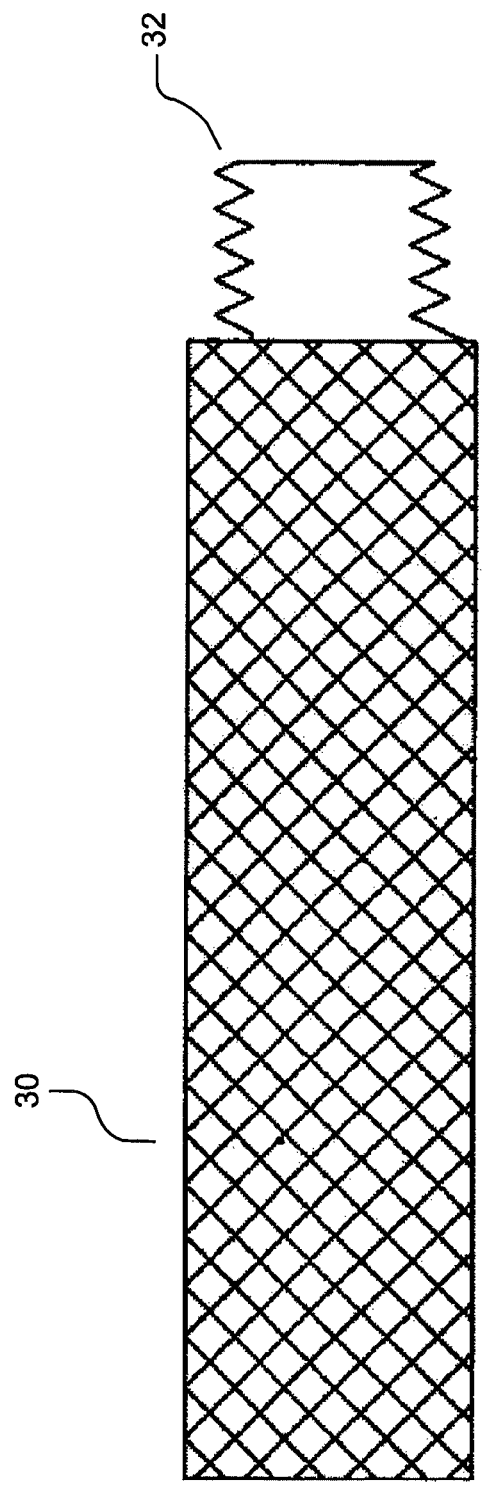
FIG. 6 shows a sectional view of an embodiment of a handle member which may be utilized with the embodiment of the tool stop apparatus.
Figure 7:
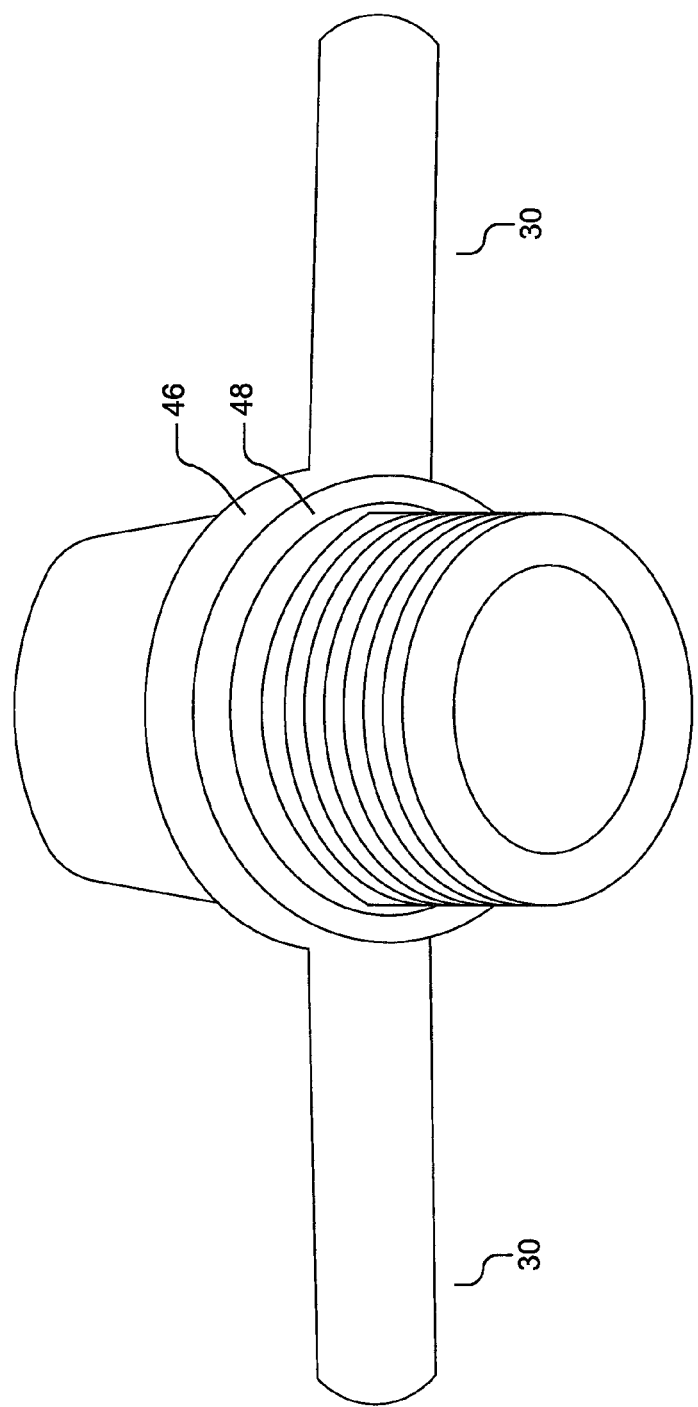
FIG. 7 shows an oblique view of an embodiment of a tool stop apparatus, viewing the downwardly facing pin.

FIG. 6 shows an embodiment of a handle member 30 which may be utilized with embodiments of the apparatus. Handle member 30 may comprise threaded end 32, which may have a ¾-10 UNC thread.

Among other acceptable materials, such as carbon steel, embodiments of the disclosed apparatus may be fabricated from 4140 stainless steel.

While the above is a description of various embodiments of the present invention, further modifications may be employed without departing from the spirit and scope of the present invention. Thus the scope of the invention should not be limited by the specific structures disclosed. Instead the true scope of the invention should be determined by the following claims.

What is claimed is:

1. An improved system for performing hydrostatic testing of oilfield tubulars as the tubulars are installed in a well, the system of the type having a tool assembly comprising a mandrel having an interior conduit and an exterior, at least two axially spaced elastomeric cups mounted on the exterior, the system further comprising a test head attached to the tool assembly, the test head hydraulically connected to the interior conduit, fluid introduction and pressurization means hydraulically connected to the test head, a fluid discharge means from the interior conduit to the exterior, the fluid discharge means disposed between the elastomeric cups wherein the elastomeric cups are adapted to expand into the internal wall of the tubulars, the improvement comprising:

a safety stop disposed between the test head and the tool assembly, the safety stop comprising a generally cylindrical body having a bore extending through its length, the cylindrical body comprising a downward facing pin and an axially-aligned upward facing box end, wherein the downward facing pin is sized to mate with an upward facing box of the tubulars, wherein the bore comprises a diameter smaller than the outside diameter of a portion of the tool assembly.

2. The improvement of claim 1 wherein the axially-aligned upward facing box end comprises rounded threads and a stabbing guide above the top thread.

3. The improvement of claim 1 wherein the generally cylindrical body further comprises an external shoulder section extending around the body.

4. The improvement of claim 1 wherein the generally cylindrical body comprises a plurality of threaded apertures and a handle member screwed into each threaded aperture.

5. The improvement of claim 1 wherein the generally cylindrical body further comprises an external shoulder section extending around the body, the external shoulder section comprising a plurality of threaded apertures, and a handle member screwed into each threaded aperture.

6. The improvement of claim 3 wherein the external shoulder section comprises a downward facing surface, said downward facing surface comprising an O-ring groove.

7. A safety stop used in combination with a hydrostatic testing apparatus for oilfield tubulars, wherein the hydrostatic testing apparatus comprises a pair of axially spaced test cups comprising an elastomeric material, wherein the test cups are mounted on a mandrel, wherein the safety stop comprises:

a generally cylindrical body having a bore extending through its length, the cylindrical body comprising a downward facing pin and an axially-aligned upward facing box end, wherein the bore comprises a diameter smaller than the outside diameter of a portion of the hydrostatic test apparatus; and a plurality of outwardly extending handle members attached to the cylindrical body.

8. The safety stop of claim 7 wherein the axially-aligned upward facing box end comprises rounded threads and a stabbing guide above the top thread.

9. The safety stop of claim 7 wherein the generally cylindrical body further comprises an external shoulder section extending around the body.

10. The safety stop of claim 7 wherein the generally cylindrical body comprises a plurality of threaded apertures, a handle member screwed into each threaded aperture.

11. The safety stop of claim 7 wherein the generally cylindrical body further comprises an external shoulder section extending around the body, the external shoulder section comprising a plurality of threaded apertures, a handle member screwed into each threaded aperture.

12. The safety stop of claim 9 wherein the external shoulder section comprises a downward facing surface, said downward facing surface comprising an O-ring groove.

13. A method for preventing the non-intentional upward release of a hydrotest tool from an oilfield tubing string, the method comprising the following steps:

inserting a joint of oilfield tubing into a well until a substantial portion of the joint is in the well, leaving a box end of the tubing accessible at the surface;

placing a tool assembly within the portion of the joint in the well, the tool assembly comprising a mandrel having an interior conduit and an exterior, at least two axially spaced elastomeric cups mounted on the exterior, and slips attached to the mandrel, wherein a test head assembly attached to the mandrel extends above the box end of the tubing;

attaching a safety stop to the box end of the tubing, the safety stop comprising a generally cylindrical body having a bore extending through its length, the cylindrical body comprising a downward facing pin and an axially-aligned upward facing box end, wherein the downward facing pin is sized to mate with the upward facing box and the bore comprises a diameter smaller than the outside diameter of a portion of the mandrel;

connecting a hydraulic test line to the test head assembly and introducing a hydraulic test liquid through the hydrostatic test assembly into the joint;

pressurizing the joint to a desired test pressure; and removing the safety stop from the box end of the tubing.

14. The method of claim 13 wherein the axially-aligned upward facing box end comprises rounded threads and a stabbing guide above the top thread.

15. The method of claim 13 wherein the generally cylindrical body further comprises an external shoulder section extending around the body.

16. The method of claim 13 wherein the generally cylindrical body comprises a plurality of threaded apertures, a handle member screwed into each threaded aperture.

17. The method of claim 13 wherein the generally cylindrical body further comprises an external shoulder section extending around the body, the external shoulder section comprising a plurality of threaded apertures, a handle member screwed into each threaded aperture.

18. The method of claim 15 wherein the external shoulder section comprises a downward facing surface, said downward facing surface comprising an O-ring groove.

* * * * *